United States Patent
Boiero et al.

(10) Patent No.: US 10,942,285 B2
(45) Date of Patent: Mar. 9, 2021

(54) HORIZON-BASED SPLITTING INTENSITY INVERSION FOR ANISOTROPIC CHARACTERIZATION OF A TARGET VOLUME

(71) Applicant: SCHLUMBERGER TECHNOLOGY CORPORATION, Sugar Land, TX (US)

(72) Inventors: Daniele Boiero, Wells (GB); Claudio Bagaini, Cottenham (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 372 days.

(21) Appl. No.: 15/776,075

(22) PCT Filed: Oct. 14, 2016

(86) PCT No.: PCT/US2016/056928
§ 371 (c)(1),
(2) Date: May 14, 2018

(87) PCT Pub. No.: WO2017/087100
PCT Pub. Date: May 26, 2017

(65) Prior Publication Data
US 2019/0346580 A1 Nov. 14, 2019

Related U.S. Application Data

(60) Provisional application No. 62/257,023, filed on Nov. 18, 2015.

(51) Int. Cl.
*G01V 1/28* (2006.01)
*G01V 1/30* (2006.01)
*G01V 1/36* (2006.01)

(52) U.S. Cl.
CPC ............... *G01V 1/284* (2013.01); *G01V 1/28* (2013.01); *G01V 1/30* (2013.01); *G01V 1/362* (2013.01);
(Continued)

(58) Field of Classification Search
CPC . G01V 1/284; G01V 1/28; G01V 1/30; G01V 1/362; G01V 2210/586; G01V 2210/626
See application file for complete search history.

(56) References Cited

U.S. PATENT DOCUMENTS 4,903,244 A 2/1990 Alford
5,610,875 A 3/1997 Gaiser
(Continued)

OTHER PUBLICATIONS

Alford, "Shear data in the presence of azimuthal anisotropy," Dilley, Texas, SEG Expanded Abstracts, 1986, vol. 5, p. 476-479.
(Continued)

*Primary Examiner* — Ian J Lobo
(74) *Attorney, Agent, or Firm* — Michael Guthrie

(57) ABSTRACT

A method for seismic processing includes receiving seismic data representing a subsurface volume. The seismic data includes a first horizontal component and a second horizontal component. The first and second horizontal components are rotated such that the first horizontal component is substantially aligned with a source of a seismic wavefield and the second horizontal component is substantially transverse to the source of the seismic wavefield. A splitting intensity is determined at a boundary of the subsurface volume using the first and second horizontal components after the first and second horizontal components are rotated. An anisotropic parameter is determined for a portion of the subsurface volume as a function of time using the splitting intensity.

18 Claims, 9 Drawing Sheets

(52) U.S. Cl.
CPC .. *G01V 2210/586* (2013.01); *G01V 2210/626* (2013.01)

(56) References Cited

U.S. PATENT DOCUMENTS

| | | | |
|---|---|---|---|
| 6,292,754 | B1 | 9/2001 | Thomsen |
| 6,556,921 | B1 * | 4/2003 | Hardage ................ G01V 1/053 702/14 |
| 6,625,542 | B1 | 9/2003 | Graebner |
| 6,862,531 | B2 | 3/2005 | Horne et al. |
| 2010/0128562 | A1 | 5/2010 | Bilas |
| 2010/0128563 | A1 | 5/2010 | Luciano et al. |
| 2010/0238765 | A1 | 9/2010 | Grechka et al. |
| 2014/0058678 | A1 | 2/2014 | Bansal et al. |
| 2014/0198614 | A1 | 7/2014 | Bansal et al. |
| 2014/0297193 | A1 | 10/2014 | Mattocks et al. |

OTHER PUBLICATIONS

Bale, et al., "Shear wave splitting applications for fracture analysis and improved imaging: Some onshore examples," First Break, 2009, vol. 27, No. 9, pp. 73-83.
Chevrot, 2000, "Multichannel analysis of shear wave splitting," Journal of Geophysical Research, 2000, vol. 105, No. 89, pp. 21579-21590.
Chevrot, et al., "Shear wave splitting in three-dimensional anisotropic media," Geophysical Journal International, 2004, vol. 159, Issue 2, pp. 711-720.
Chevrot, "Finite frequency vectorial tomography: a new method for high-resolution imaging of upper mantle anisotropy," Geophysical Journal International 2006, vol. 165, Issue 2, pp. 641-657.
Gaiser, 1999, "Applications for vector coordinate systems of 3-D converted wave data," Leading Edge, 1999, vol. 18, pp. 1290-1300.
Haacke, "High-precision estimation of split PS-wave time delays and polarization directions," Geophysics, 2013, vol. 78, No. 2, pp. V63-V77.
Long et al., "Wave-equation shear wave splitting tomography," Geophysical Journal International 2008, vol. 172, Issue 1, pp. 311-330.
Long, et al., "Shear Wave Splitting and Mantle Anisotropy: Measurements, Interpretations, and New Directions," Surveys in Geophysics 2009, vol. 30, pp. 407-461.
Sieminski et al., "Finite-frequency Sks splitting: measurement and sensitivity kernels," Bulletin of the Seismological Society of America, 2008, vol. 98, pp. 1797-1810.
Silver, et al., "Shear wave splitting and subcontinental mantle deformation," Journal of Geophysical Research, 1991, vol. 96, pp. 429-454.
Silver, et al., 2011, "The non-commutivity of shear wave splitting operators at low frequencies and implications for anisotropy tomography," Geophysical Journal International, 2011, vol. 184, Issue 3, pp. 1415-1427.
Simmons, Jr., 2009, "Converted-wave splitting estimation and compensation," Geophysics, 2009, vol. 74, No. 1, pp. D37-D48.
International Search Report and Written Opinion for the equivalent International patent application PCT/US2016/056928 dated Jan. 31, 2017.
International Preliminary Report on Patentability for the equivalent International patent application PCT/US2016/056928 dated May 31, 2018.
Kong et al., A Systematic Comparison of the Transverse Energy Minimization and Splitting Intensity Techniques for Measuring Shear-Wave Splitting Parameters, Seismological Society of America, Bulletin, vol. 105, No. 1, Dec. 9, 2014, pp. 230-239.
Favier et al: Sensitivity Kernels for shear wave splitting in transverse isotropic media, Geophysical Journal International., vol. 153, No. 1, Apr. 1, 2003, pp. 213-228.
The Extended Search Report issued in the related EP Application 16866813.5, dated Jul. 24, 2019 (8 pages).

* cited by examiner

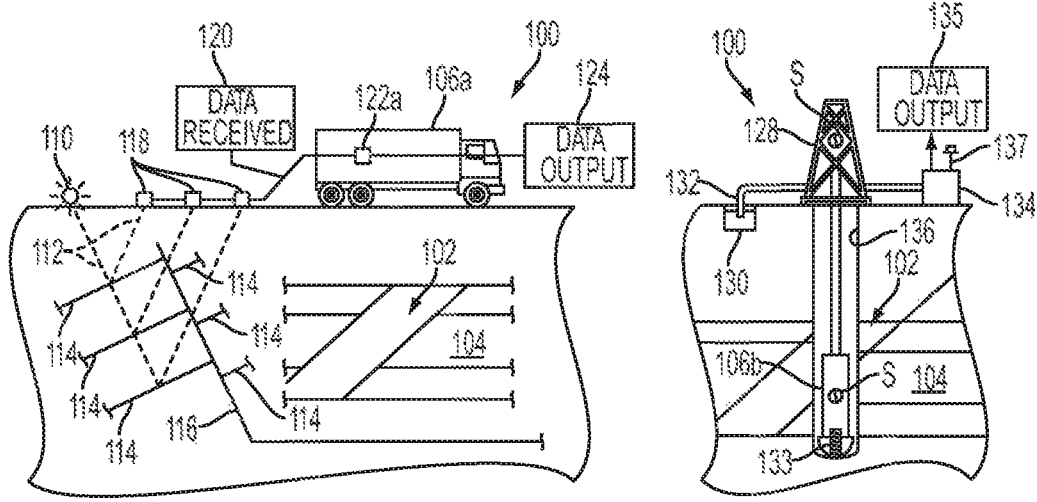
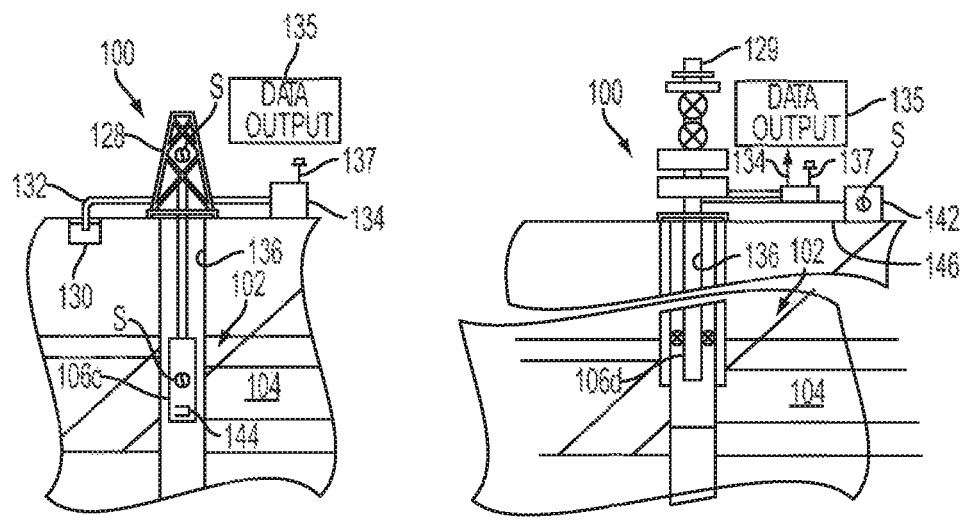

HORIZON-BASED SPLITTING INTENSITY INVERSION FOR ANISOTROPIC CHARACTERIZATION OF A TARGET VOLUME

CROSS-REFERENCE TO RELATED APPLICATIONS

This application claims priority to U.S. Provisional Patent Application No. 62/257,023, filed on Nov. 18, 2015, the disclosure of which is incorporated by reference herein in its entirety.

BACKGROUND

In azimuthally-anisotropic media, the propagation velocity of shear waves varies with azimuth. This is a result of unequal sub-horizontal stresses or sub-vertical fractures. In these cases, shear waves naturally polarize into a fast wave parallel to the fractures and a slow wave perpendicular to the fractures. This is a phenomenon known as shear wave splitting ("SWS").

SWS can cause difficulties in obtaining accurate images of the reservoir in multicomponent data processing, because interference between the two modes can degrade both the amplitude and resolution of the data. For this reason, SWS is generally analysed and compensated for to maximize the value of the shear waves for mapping the reservoir. On the other hand, measurements of SWS from anisotropic rocks and sediments may be linked to the properties of aligned cracks and fractures. The character of SWS, and how it changes in space and time, provides information about: (1) stress orientation, (2) anisotropic permeability, and (3) pore-fluid pressure.

The analysis of SWS has become routine in the processing of multicomponent data where the resulting effects of SWS are detected by the two horizontal geophones at each receiver station in a manner such that the fast and slow shear waves are mixed on each horizontal component. This analysis leads to the determination of the principal directions of the azimuthally-anisotropic medium and to the estimation of the differences in characteristics between the fast and slow shear waves.

If the split shear waves encounter a layer, while traveling to the surface, where the principal directions change, they will split again. In this case, shear wave waveform and polarization can become complicated, and a layer stripping procedure might be called for to unravel deeper anisotropy directions. This means that splitting parameters (e.g., directions of fractures and delays between orthogonally polarized shear waves) are estimated layer by layer from the top. Errors in layer stripping may accumulate to unmanageable levels when the number of layers increases beyond a few.

SUMMARY

Embodiments of the disclosure may provide a method for seismic processing. The method includes receiving seismic data representing a subsurface volume. The seismic data includes a first horizontal component and a second horizontal component. The first and second horizontal components are rotated such that the first horizontal component is substantially aligned with a source of a seismic wavefield and the second horizontal component is substantially transverse to the source of the seismic wavefield. A splitting intensity is determined at a boundary of the subsurface volume using the first and second horizontal components after the first and second horizontal components are rotated. An anisotropic parameter is determined for a portion of the subsurface volume as a function of time using the splitting intensity.

In an embodiment, the seismic data includes multi-azimuth P-S(S-S) multicomponent data.

In an embodiment, the seismic data is received by a sensor positioned at the surface, on a sea bed, or in a wellbore.

In an embodiment, the seismic data further includes a first vertical component.

In an embodiment, the method further includes removing coherent noise from the first and second horizontal components after the first and second horizontal components are rotated and before the splitting intensity is determined.

In an embodiment, the splitting intensity is determined as a function of azimuth at different depths.

In an embodiment, the method further includes determining an anisotropic parameter as a function of depth using the splitting intensity.

In an embodiment, the method further includes determining a sensitivity kernel that links the splitting intensity to a first depth and a second depth, and determining the anisotropic parameter as a function of depth includes inverting the splitting intensity at the first depth and the second depth using the sensitivity kernel.

In an embodiment, the anisotropic parameter as a function of time includes a delay time between shear waves polarized in different symmetry planes, and the anisotropic parameter as a function of depth includes gamma parameters In an embodiment, the method further includes performing a drilling action in response to the anisotropic parameter as a function of time, the anisotropic parameter as a function of depth, or a combination thereof.

Embodiments of the disclosure may also provide a non-transitory computer-readable medium storing instructions that, when executed by at least one processor of a computing system, cause the computing system to perform operations. The operations include receiving seismic data representing a subsurface volume. The seismic data includes a first horizontal component and a second horizontal component. The first and second horizontal components are rotated such that the first horizontal component is substantially aligned with a source of a seismic wavefield and the second horizontal component is substantially transverse to the source of the seismic wavefield. A splitting intensity is determined at a boundary of the subsurface volume using the first and second horizontal components after the first and second horizontal components are rotated. An anisotropic parameter is determined for a portion of the subsurface volume as a function of time using the splitting intensity.

Embodiments of the disclosure may also provide a computing system. The computer system includes a processor and a memory system. The memory system includes a non-transitory computer-readable medium storing instructions that, when executed by the processor, cause the computing system to perform operations. The operations include receiving seismic data representing a subsurface volume. The seismic data includes a first horizontal component and a second horizontal component. The first and second horizontal components are rotated such that the first horizontal component is substantially aligned with a source of a seismic wavefield and the second horizontal component is substantially transverse to the source of the seismic wavefield. A splitting intensity is determined at a boundary of the subsurface volume using the first and second horizontal components after the first and second horizontal components are rotated. An anisotropic parameter is determined for a portion of the subsurface volume as a function of time using the splitting intensity.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
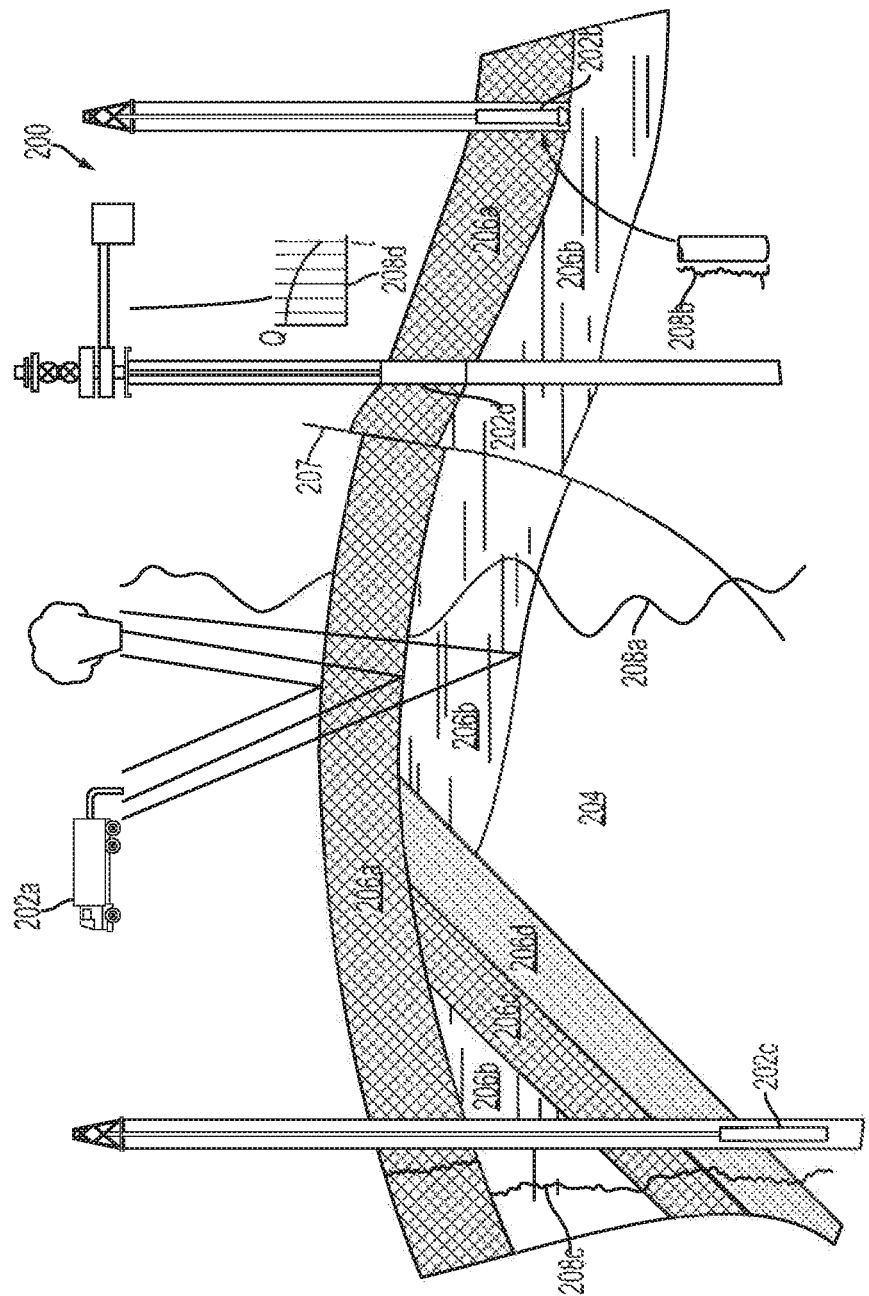

In general, embodiments of the present disclosure may provide a method for seismic processing that includes inverting interval values of splitting intensity ("SI"). For example, interval values of SI can be inverted to obtain a model of anisotropic parameters varying with time or depth. SI is a robust measurement with respect to structural variations and is commutative, which means that it can be summed along a ray (or throughout a sensitivity kernel volume) and can be linearly related to anisotropic perturbations at depth. Thus, the method may include estimating anisotropic properties within a geological formation (e.g., a target volume like the reservoir) by analyzing the differences of the SI measured at the top and at the bottom of the layer. In some embodiments, this allows layer stripping to be avoided, in particular for shallow layers where anisotropic parameters are difficult to estimate due to poor coverage. The method may also facilitate application of SWS analysis.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of an oilfield 100 having a subterranean formation 102 containing a reservoir 104 therein in accordance with implementations of various technologies and techniques described herein. FIG. 1A illustrates a survey operation being performed by a survey tool, such as seismic truck 106.1, to measure properties of the subterranean formation 102. The survey operation is a seismic survey operation for producing vibrations. In FIG. 1A, one such vibration, e.g., sound vibration 112 generated by source 110, reflects off horizons 114 in the earth formation 116. A set of vibrations is received by sensors, such as geophone-receivers 118, situated on the earth's surface. The data received 120 is provided as input data to a computer 122.1 of the seismic truck 106.1, and responsive to the input data, a computer 122.1 generates seismic data output 124. This seismic data output may be stored, transmitted, or further processed as desired, for example, by data reduction.

FIG. 1B illustrates a drilling operation being performed by drilling tools 106.2 suspended by rig 128 and advanced into the subterranean formation 102 to form a wellbore 136. A mud pit 130 is used to draw drilling mud into the drilling tools via flow line 132 for circulating the drilling mud down through the drilling tools, then up wellbore 136 and back to the surface. The drilling mud is filtered and returned to the mud pit 130. A circulating system may be used for storing, controlling, or filtering the flowing drilling mud. The drilling tools are advanced into subterranean formations 102 to reach the reservoir 104. Each well may target one or more reservoirs. The drilling tools are adapted for measuring downhole properties using logging-while-drilling tools. The logging-while-drilling tools may also be adapted for taking core samples 133.

Computer facilities may be positioned at various locations about the oilfield 100 (e.g., the surface unit 134) and/or at remote locations. The surface unit 134 may be used to communicate with the drilling tools and/or offsite operations, as well as with other surface or downhole sensors. The surface unit 134 is capable of communicating with the drilling tools to send commands to the drilling tools, and to receive data therefrom. The surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, the sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. The sensors (S) may also be positioned in one or more locations in the circulating system.

The drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with the surface unit 134. The bottom hole assembly further includes drill collars for performing various other measurement functions.

The bottom hole assembly may include a communication subassembly that communicates with the surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling or other operations are performed, the subsurface conditions may change. The earth model may also be adjusted as new information is collected The data gathered by the sensors (S) may be collected by the surface unit 134 and/or other data collection sources for analysis or other processing. The data collected by the sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

The surface unit 134 may include a transceiver 137 to allow communications between the surface unit 134 and various portions of the oilfield 100 or other locations. The surface unit 134 may also be provided with or functionally connected to one or more controllers (not shown) for actuating mechanisms at the oilfield 100. The surface unit 134 may then send command signals to the oilfield 100 in response to data received. The surface unit 134 may receive commands via the transceiver 137 or may itself execute commands to the controller. A processor may be provided to analyze the data (locally or remotely), make the decisions, and/or actuate the controller. In this manner, the oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by a wireline tool 106.3 suspended by the rig 128 and into the wellbore 136 of FIG. 1B. The wireline tool 106.3 is adapted for deployment into the wellbore 136 for generating well logs, performing downhole tests, and/or collecting samples. The wireline tool 106.3 may be used to provide another method and apparatus for performing a seismic survey operation. The wireline tool 106.3 may, for example, have an explosive, radioactive, electrical, or acoustic energy source 144 that sends and/or receives electrical signals to the surrounding subterranean formations 102 and fluids therein.

The wireline tool 106.3 may be operatively connected to, for example, the geophones 118 and the computer 122.1 of the seismic truck 106.1 of FIG. 1A. The wireline tool 106.3 may also provide data to the surface unit 134. The surface unit 134 may collect data generated during the wireline operation and may produce a data output 135 that may be stored or transmitted. The wireline tool 106.3 may be positioned at various depths in the wellbore 136 to provide a survey or other information relating to the subterranean formation 102.

The sensors (S), may be positioned about the oilfield 100 to collect data relating to various field operations as described previously. As shown, the sensor S is positioned in the wireline tool 106.3 to measure downhole parameters which relate to, for example porosity, permeability, fluid composition and/or other parameters of the field operation.

FIG. 1D illustrates a production operation being performed by a production tool 106.4 deployed from a production unit or Christmas tree 129 and into the completed wellbore 136 for drawing fluid from the downhole reservoirs into surface facilities 142. The fluid flows from the reservoir 104 through perforations in the casing (not shown) and into the production tool 106.4 in the wellbore 136 and to the surface facilities 142 via a gathering network 146.

The sensors (S) may be positioned about the oilfield 100 to collect data relating to various field operations as described previously. As shown, the sensor (S) may be positioned in the production tool 106.4 or associated equipment, such as the Christmas tree 129, the gathering network 146, the surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of the oilfield 100, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of the oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section, of an oilfield 200 having data acquisition tools 202.1, 202.2, 202.3 and 202.4 positioned at various locations along the oilfield 200 for collecting data from the subterranean formation 204 in accordance with implementations of various technologies and techniques described herein. The data acquisition tools 202.1-202.4 may be the same as the data acquisition tools 106.1-106.4 of FIGS. 1A-1D, respectively, or others not depicted. As shown, the data acquisition tools 202.1-202.4 generate data plots or measurements 208.1-208.4, respectively. These data plots are depicted along the oilfield 200 to demonstrate the data generated by the various operations.

The data plots 208.1-208.3 are examples of static data plots that may be generated by the data acquisition tools 202.1-202.3, respectively; however, it should be understood that the data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

The static data plot 208.1 is a seismic two-way response over a period of time. The static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. The static data plot 208.3 is a logging trace that provides a resistivity or other measurement of the formation at various depths.

A production decline curve or graph 208.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that the oilfield 200 may contain a variety of geological structures and/or formations, sometimes having extreme complexity. In some locations, below the water line, fluid may occupy pore spaces of the formations. Each of the measurement devices may be used to measure properties of the formations and/or its geological features. While each acquisition tool is shown as being in specific locations in the oilfield 200, it will be appreciated that one or more types of measurements may be taken at one or more locations across one or more fields or other locations for comparison and/or analysis.

The data collected from various sources, such as the data acquisition tools of FIG. 2, may then be processed and/or evaluated. The seismic data displayed in static data plot 208.1 from data acquisition tool 202.1 is used by a geophysicist to determine characteristics of the subterranean formations and features. The core data shown in static plot 208.2 and/or log data from well log 208.3 are used by a geologist to determine various characteristics of the subterranean formation. The production data from graph 208.4 is used by the reservoir engineer to determine fluid flow reservoir characteristics. The data analyzed by the geologist, geophysicist and the reservoir engineer may be analyzed using modeling techniques.

Figure 3A:
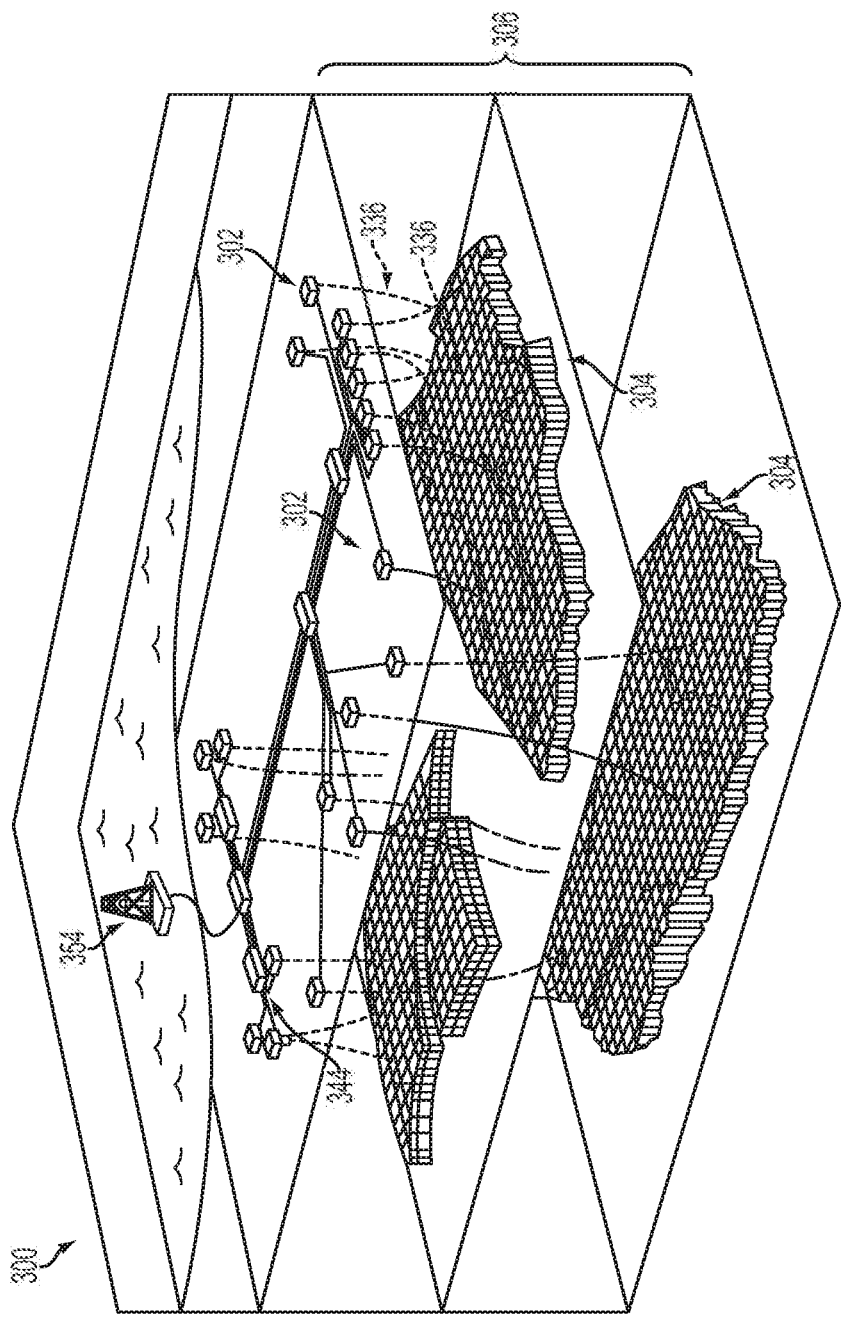

FIG. 3A illustrates an oilfield 300 for performing production operations in accordance with implementations of various technologies and techniques described herein. As shown, the oilfield has a plurality of wellsites 302 operatively connected to a central processing facility 354. The oilfield configuration of FIG. 3A is not intended to limit the scope of the oilfield application system. At least part of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms a wellbore 336 into the earth. The wellbores extend through the subterranean formations 306 including the reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to the processing facility 354.

Figure 3B:
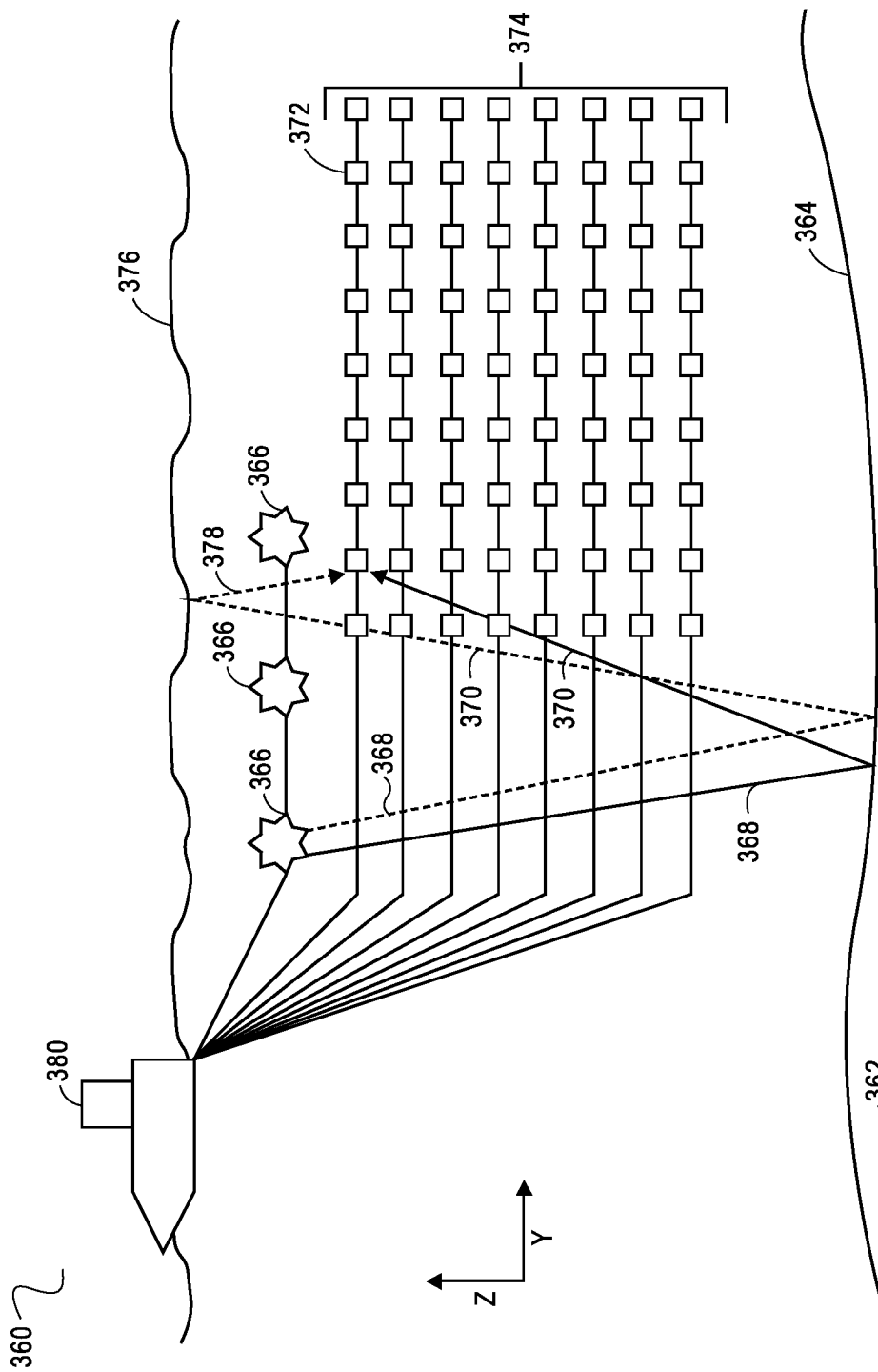

Attention is now directed to FIG. 3B, which illustrates a side view of a survey (e.g., a marine-based survey) 360 of a subterranean subsurface 362 in accordance with one or more implementations of various techniques described herein. The subsurface 362 includes a seafloor surface 364. Seismic sources 366 may include sources such as vibroseis or airguns, which may propagate seismic waves 368 (e.g., energy signals) into the Earth over an extended period of time or at a nearly instantaneous energy provided by impulsive sources. The seismic waves may be propagated by sources as a frequency sweep signal. For example, sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by the seafloor surface 364 (i.e., reflector), and seismic wave reflections 370 may be received by a plurality of seismic receivers 372. The seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy, and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication, or the like. The vessel 380 may then transmit the electrical signals to a data processing center. In another embodiment, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may include multiple reflectors, some of which may include dipping events, and may generate multiple reflections (including wave conversion) for receipt by the seismic receivers 372. In one implementation, the seismic data may be processed to generate a seismic image of the subsurface 362.

Seismic acquisition systems tow each streamer in the streamer array 374 at the same depth (e.g., 5-10 m). However, the survey 360 may tow each streamer in streamer array 374 at different depths such that seismic data may be acquired and processed in a manner that avoids the effects of destructive interference due to sea-surface ghost waves. For instance, the survey 360 of FIG. 3B illustrates eight streamers towed by vessel 380 at eight different depths. The depth of each streamer may be controlled and maintained using the birds disposed on each streamer.

In azimuthally anisotropic media, resulting from unequal sub-horizontal stresses or sub-vertical fractures, the propagation velocity of shear waves varies with azimuth. In these cases, shear waves naturally polarize into a fast wave parallel to the fractures and a slow wave perpendicular to them.

In this context, a vertically-propagating shear wave through a horizontally transverse isotropic ("HTI") medium may be considered illustrative. Arriving at the bottom of the anisotropic layer, the shear wave splits into a fast and a slow wave. Introducing the incident wavelet ($u_R^0(t)$) and the angle between the projection of the fast wave polarization in the horizontal plane and the radial direction ($\beta$), the signals on the radial and transverse components recorded at the surface may be expressed as:

$$u_R(t) = u_R^0\left(t + \frac{\delta t}{2}\right)\cos^2\beta + u_R^0\left(t - \frac{\delta t}{2}\right)\sin^2\beta, \quad (1)$$

$$\delta u_T(t) = \frac{1}{2}\left[u_R^0\left(t + \frac{\delta t}{2}\right) - u_R^0\left(t - \frac{\delta t}{2}\right)\right]\sin 2\beta. \quad (2)$$

For a delay time that is small compared to the dominant period of the propagating wave, these expressions simplify to:

$$u_R(t) = u_R^0(t), \quad (3)$$

$$\delta u_T(t) = \frac{1}{2}(\delta t \sin 2\beta)\dot{u}_R^0(t). \quad (4)$$

The transverse component is the time derivative of the radial component multiplied by a scalar ($\delta t \sin 2\beta$). This scalar has been defined as splitting intensity ("SI").

$$\delta u_T(t) = \frac{1}{2} SI \dot{u}_R^0(t). \quad (1)$$

At this point, even though the example refers to a HTI medium, no assumption has to be made regarding the symmetry and heterogeneity of the anisotropic medium. Thus, equation 5 remains valid in a heterogeneous anisotropic medium. SI can thus be measured by projecting the transverse component on the derivative of the radial component:

$$SI = 2\frac{\mathrm{Re}\int_{-\infty}^{+\infty} i\omega \delta u_T(\omega) u_R^0{}^*(\omega) d\omega}{\int_{-\infty}^{+\infty} \omega^2 |u_R^0(\omega)|^2 d\omega}. \quad (6)$$

In another embodiment, SI may also be given by the first right eigenvector of the matrix containing the transverse components of the records. Experiments on synthetic seismograms demonstrate that both approaches provide robust estimates of SI. However, the projection approach may, in some cases, give measurements that are closer to the inputs and with smaller error bars, which suggests that it may be used when the signal-to-noise ratio is low. SI may also be measured by a robust cross-correlation method that estimates lags between R and the sum of R and T components.

Figure 4:
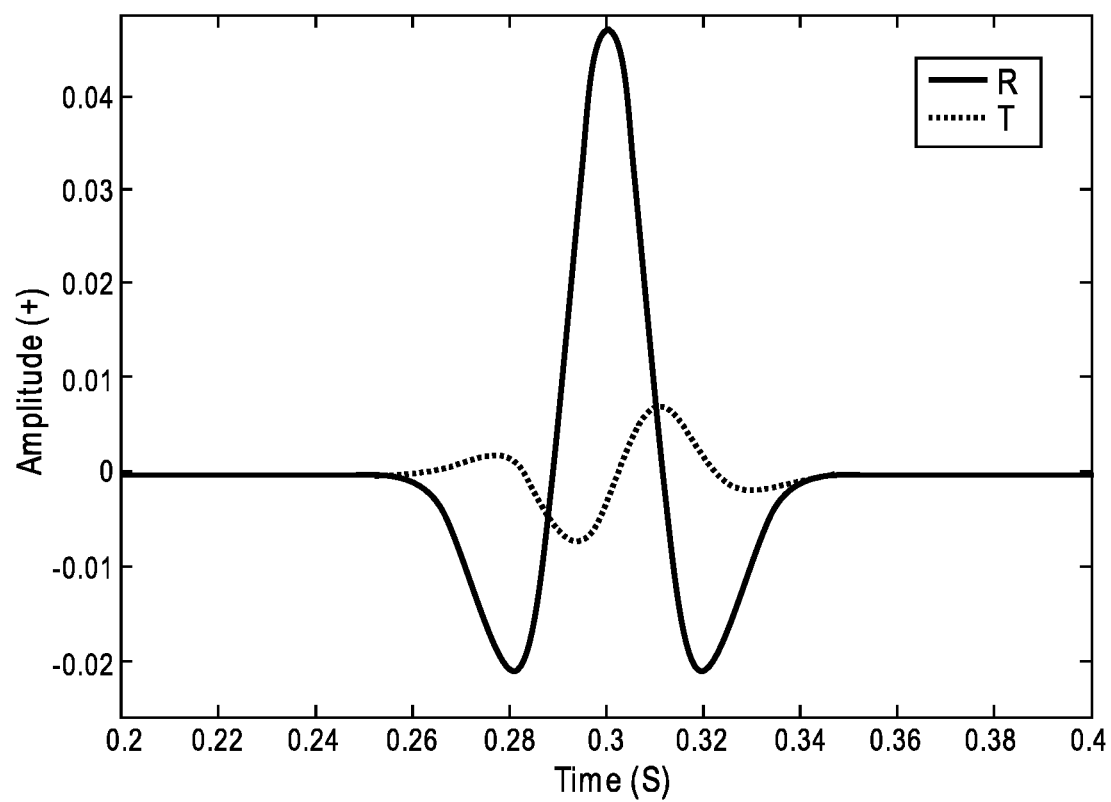
FIG. 4 illustrates a plot of radial and transverse components, according to an embodiment.

FIG. 4 illustrates radial and transverse components described by equations 3 and 4. Considering the simple case above of a plane shear wave propagating vertically in a HTI medium, studying the variations of SI as a function of azimuth, the polarization of the incoming wave, may be used to determine the splitting parameters (e.g., the delay time and the orientation of the symmetry axis).

Defining $\varphi$ the azimuth of the plane in which incoming wave is polarized and $\varphi_0$ the orientation of the symmetry axis, in the previously mentioned HTI medium, the SI can be rewritten as $$SI(\varphi) = \delta t \sin 2(\varphi \varphi_0), \quad (7)$$

i.e., it has a sinusoidal variation with azimuth.

In cases with multiple HTI layers, depth-dependent anisotropy produces a SI recorded at the top that represents the vertical integration of splitting intensities over the anisotropic layers crossed by the seismic wave (as shown in and described below with reference to FIG. 5A):

$$SI(\varphi) = \delta t_1 \sin 2(\varphi \varphi_1) + \delta t_2 \sin 2(\varphi \varphi_2) + \delta t_3 \sin 2(\varphi \varphi_3). \quad (8)$$

In the case of different symmetries of the anisotropic medium, equation 8 would assume different forms.

Figure 5B:
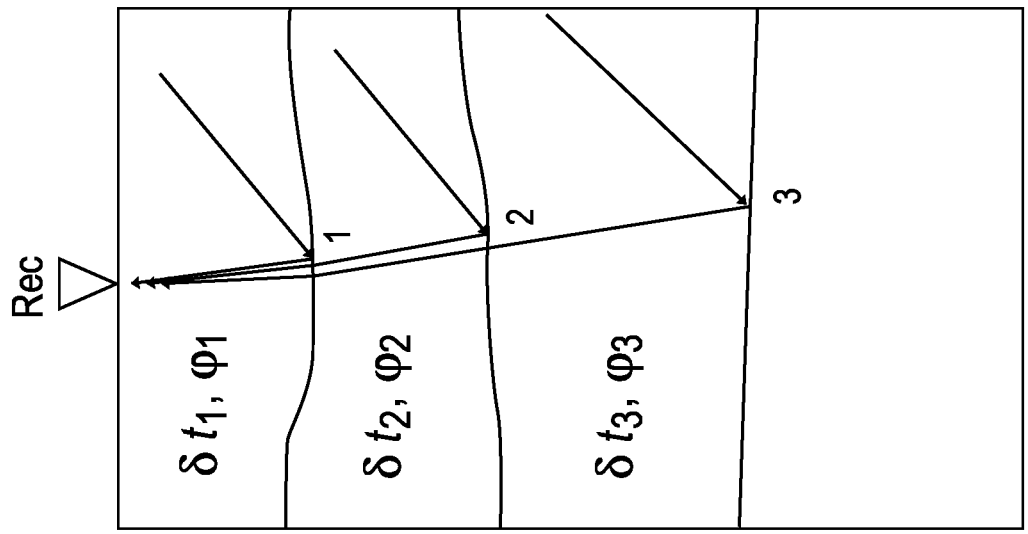
FIG. 5B illustrates a stack of anisotropic layers and converted waves at layer boundaries, according to an embodiment.
Figure 5A:
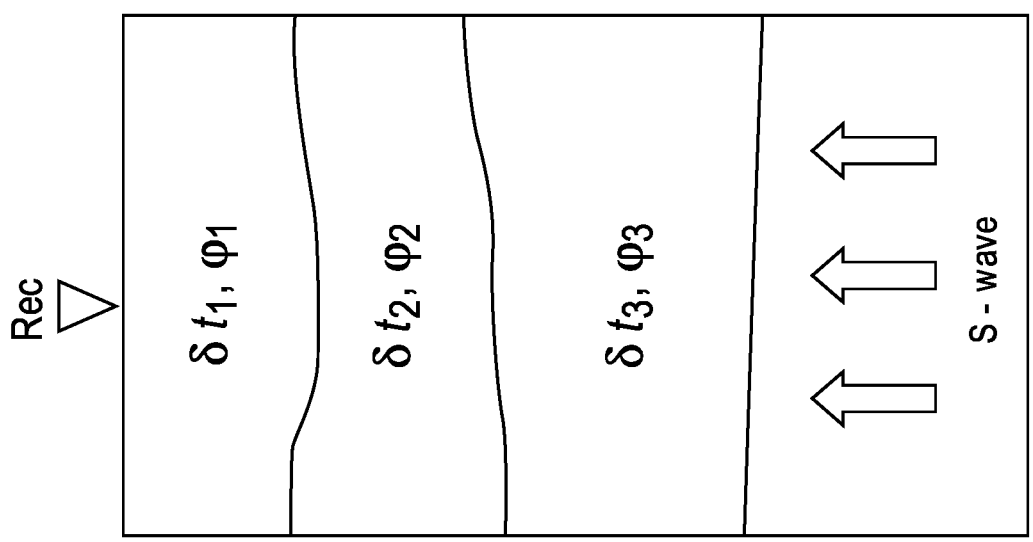
FIG. 5A illustrates a stack of anisotropic layers and a plane shear wave propagating vertically, according to an embodiment.

FIGS. 5A and 5B illustrate a stack of anisotropic layers with a plane shear wave propagating vertically, and converted waves at layer boundaries, respectively. Because SI is commutative (equation 7), the SI observations may not be affected if the order of the layers in FIG. 5A is switched. This can be a problem in characterizing the mantle anisotropy in global seismology because normally one measure of SI is available at the surface. Further, this method may depend at least partially upon good coverage from various sources to the receiver (e.g., earthquakes). This may be a reason why there are few earthquake seismology data sets that have been analysed using this method.

In reflection seismology for hydrocarbon exploration, where multiple reflected events are available (covering a wide range of azimuths), both the aforementioned drawbacks may not be an issue, and the concept of SI may be used to perform a horizon based inversion for the anisotropic characterization of target volumes. In multicomponent P-S processing, for example, the value of SI may be measured for different converted shear waves generated at layer boundaries (FIG. 5B). This allows for measuring SI using events that have travelled in one or more selected layers. In case of HTI layers this will result in $$SI_1(\varphi) = \delta t_1 \sin 2(\varphi \varphi_1), \quad (9)$$

$$SI_2(\varphi) = \delta t_1 \sin 2(\varphi \varphi_1) + \delta t_2 \sin 2(\varphi \varphi_2), \quad (10)$$

$$SI_3(\varphi) = \delta t_1 \sin 2(\varphi \varphi_1) + \delta t_2 \sin 2(\varphi \varphi_2) + \delta t_3 \sin 2(\varphi \varphi_3) \quad (11)$$

Figure 6:
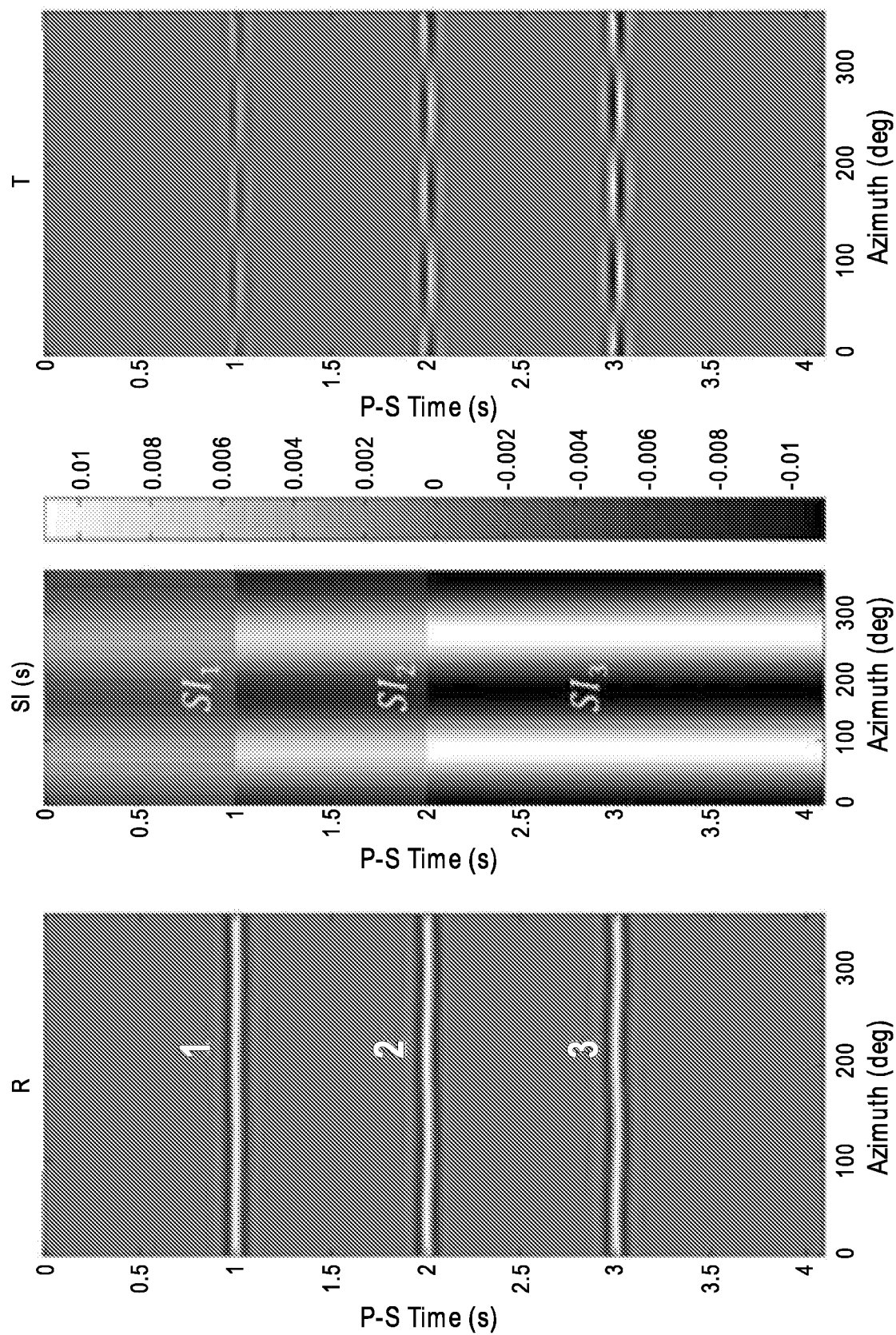
FIG. 6 illustrates radial (left) and transverse (right) components measured at the receiver in FIG. 5B. The events generated at conversion points 1, 2, and 3 are visible and are shown as a function of the azimuth. $SI_1$, $SI_2$, and $SI_3$ are measured for the three events and can be used for anisotropic parameter characterisation.

FIG. 6 illustrates radial (left) and transverse (right) components measured at the receiver in FIG. 5B. The events generated at conversion points 1, 2, and 3 are visible and are shown as a function of the azimuth. $SI_1$, $SI_2$, and $SI_3$ are measured for the three events and can be used for anisotropic parameter characterisation.

From equations 9-11, the anisotropic parameters for layer 3 may be estimated by subtracting from $SI_3(\varphi)$ the cumulative anisotropic effects of the layers above represented by $SI_2(\varphi)$. SI can then be directly inverted to obtain a model of splitting parameters varying with time. Further, the SI measurement may be employed for tomographic imaging of anisotropic structures at depth. Because the SI measurement is commutative, it can be summed along a ray (or throughout a sensitivity kernel volume valid for any orientation of the symmetry axis) and can be linearly related to anisotropic perturbations at depth.

Figure 7:
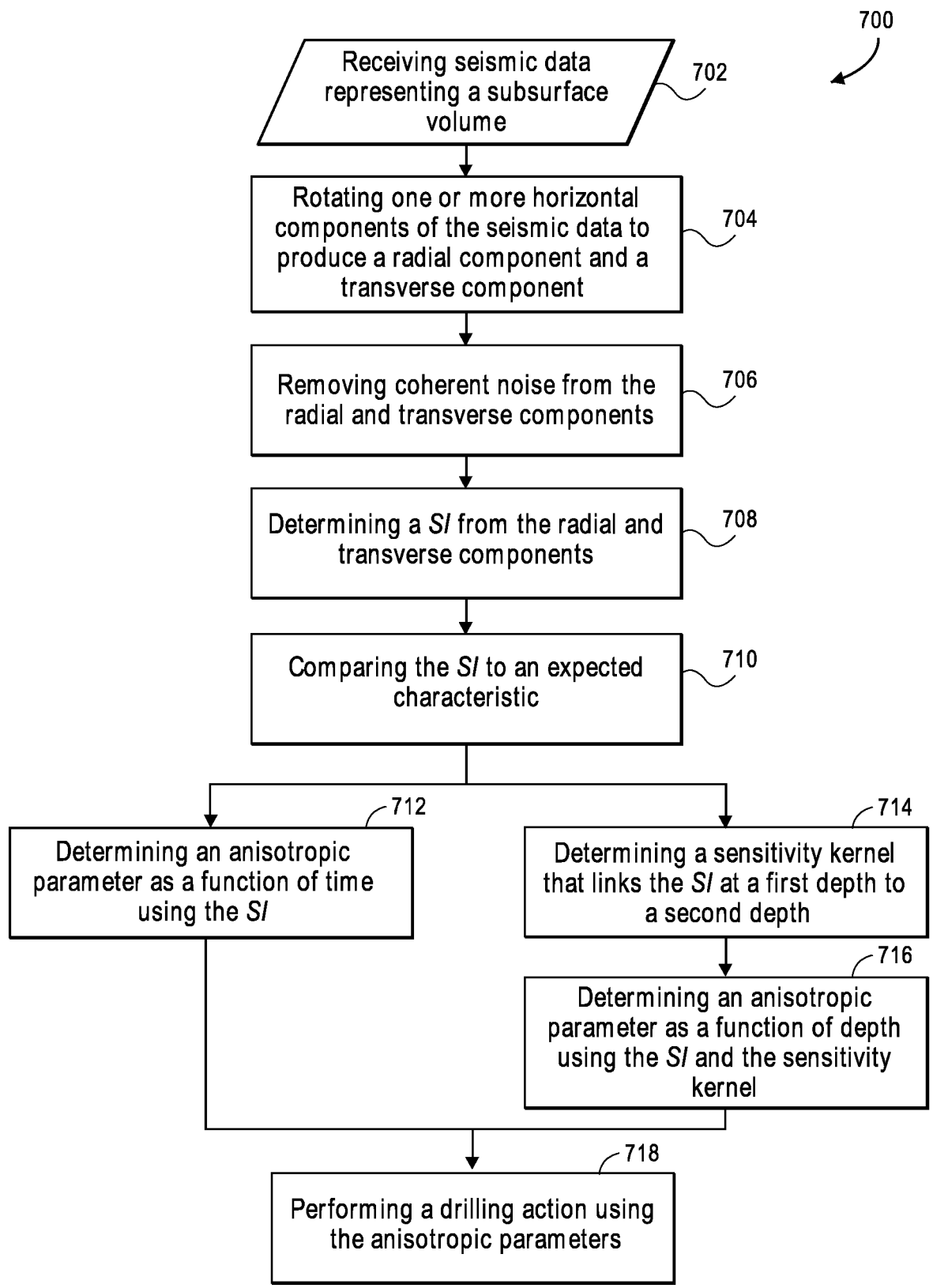
FIG. 7 illustrates a flowchart of a method for seismic processing, according to an embodiment.

FIG. 7 illustrates a flowchart of a method 700 for seismic processing, according to an embodiment. In particular, the method 700 may provide a workflow for the horizon-based SI analysis and inversion for anisotropic structure characterization. The method 700 may begin by receiving or otherwise obtaining, as input, seismic data representing a subsurface volume. The seismic data may be or include multi-azimuth P-S(S-S multicomponent data), as at 702. The data may be received or obtained by one or more sensors positioned at the surface, on the sea bed, or in the wellbore. In one example, the sensors may be part of a measurement-while-drilling ("MWD") tool or a logging-while-drilling ("LWD") tool in the wellbore. In another example, the sensors may be part of a land multi-component seismic survey, an ocean-bottom-cable ("OBC"), an ocean-bottom-sensor ("OBS"), or the like. The OBS may be similar to the OBC but not towed using a cable. Instead, the OBS may be positioned on the seabed.

The data may be or include one or more substantially vertical components and one or more substantially horizontal components of a seismic wavefield (e.g. particle velocity, particle acceleration, pressure, etc.). For example, the data may include one substantially vertical component and two substantially horizontal components of the seismic wavefield. The components are vertical and horizontal with respect to a survey reference frame. The survey reference frame may be defined by the user. Multi-component data may be rotated, on a computer, with respect to this reference frame.

The method 700 may then include rotating the one or more substantially horizontal components such that a first of the horizontal components is substantially aligned with a source of the seismic wavefield, as at 704. Thus, the first horizontal component may be referred to as a radial component. The source may be a primary source (e.g., an air gun, vibroseis, dynamite) or a secondary source (e.g., a reflection point or a conversion point). Rotating the one or more horizontal components may also cause the second of the horizontal components to be perpendicular/transverse to the radial component, and thus the source of the seismic wavefield. Thus, the second horizontal component may now be referred to as a transverse component.

The method 700 may further include removing coherent noise from the radial and transverse components, as at 706. For example, removing the coherent noise may include removing direct arrivals, surface/guided waves, multiples, and other types of noise. Coherent noise may degrade the quality of the SI that is measured below at 708.

The method 700 may also include determining a SI from the radial and transverse components, as at 708. The SI may be determined as a function of azimuth for one or more depths and/or horizons in the subterranean formation. For example, the SI may be determined at a plurality of different depths and/or horizons in the subterranean formation. The SI may be determined at one or more boundaries of the subsurface volume. For example, the SI may be determined at least at two boundaries (e.g., the bottom and top of a layer) of the subsurface volume. The method 700 may also include a quality-control feature, whereby the determined SI may be compared to an expected characteristic of the data, as at 710. If the SI does not meet the quality controls, a warning to the user may be made, or another action may be taken.

Further, the method 700 may include determining one or more anisotropic parameters for a portion of the subsurface volume as a function of time using the SI, as at 712. Determining the one or more anisotropic parameters as a function of time may include estimating the anisotropy symmetry structure of the subterranean formation. The estimate of the symmetry may be or include horizontal transverse isotropy ("HTI"), vertical transverse isotropy ("VTI"), tilted transverse isotropy ("TTI"), tilted orthorhombic ("TOR"), or a combination thereof. Given the estimated symmetry, the anisotropic parameters may be determined (e.g., estimated) based at least partially upon the orientation of the reference frame. The anisotropic parameters as a function of time may be or include delay times between shear waves polarized in different symmetry planes and/or the orientation of the symmetry reference frame.

The method 700 may also include determining a sensitivity kernel that links the SI at a first depth to a second depth, as at 714. In one example, the first depth may be at the surface, and the second depth may be below the surface (e.g., underground). The sensitivity kernel may be determined by ray-tracing, finite frequency methods, or the like.

The method 700 may also include determining one or more anisotropic parameters for a portion of the subsurface volume as a function of depth using the SI, as at 716. Determining the one or more anisotropic parameters as a function of depth may include inverting the SI measured at different depths (e.g., the first depth and/or the second depth) in the subterranean formation using the sensitivity kernel. The anisotropic parameters as a function of depth may be or include gamma parameters. The anisotropic parameters as a function of time and depth may be used, for example, for imaging improvements, fracture characterization, stress distributions, and the like. This may help in understanding the geology, geometry, and volume of the reservoir.

The method 700 may also include performing a drilling action using the anisotropic parameters (as function of time and/or depth), as at 718. The drilling action may include varying a trajectory of a downhole tool to vary a trajectory of a wellbore in response to the anisotropic parameters. In another embodiment, the drilling action may include selecting a different location to drill the wellbore. In another embodiment, the drilling action may include varying the methodology and/or technology used for drilling and/or recovery. In another embodiment, the drilling action may include varying a weight-on-bit ("WOB") of the downhole tool at one or more locations in the subterranean formation in response to the anisotropic parameters. In another embodiment, the drilling action may include varying a flow rate of fluid being pumped into the wellbore in response to the anisotropic parameters. In another embodiment, the drilling action may include varying a type (e.g., composition) of the fluid being pumped into the wellbore in response to the anisotropic parameters. In another embodiment, the drilling action may include measuring one or more additional properties in the subterranean formation using the downhole tool in response to the anisotropic parameters.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 8:
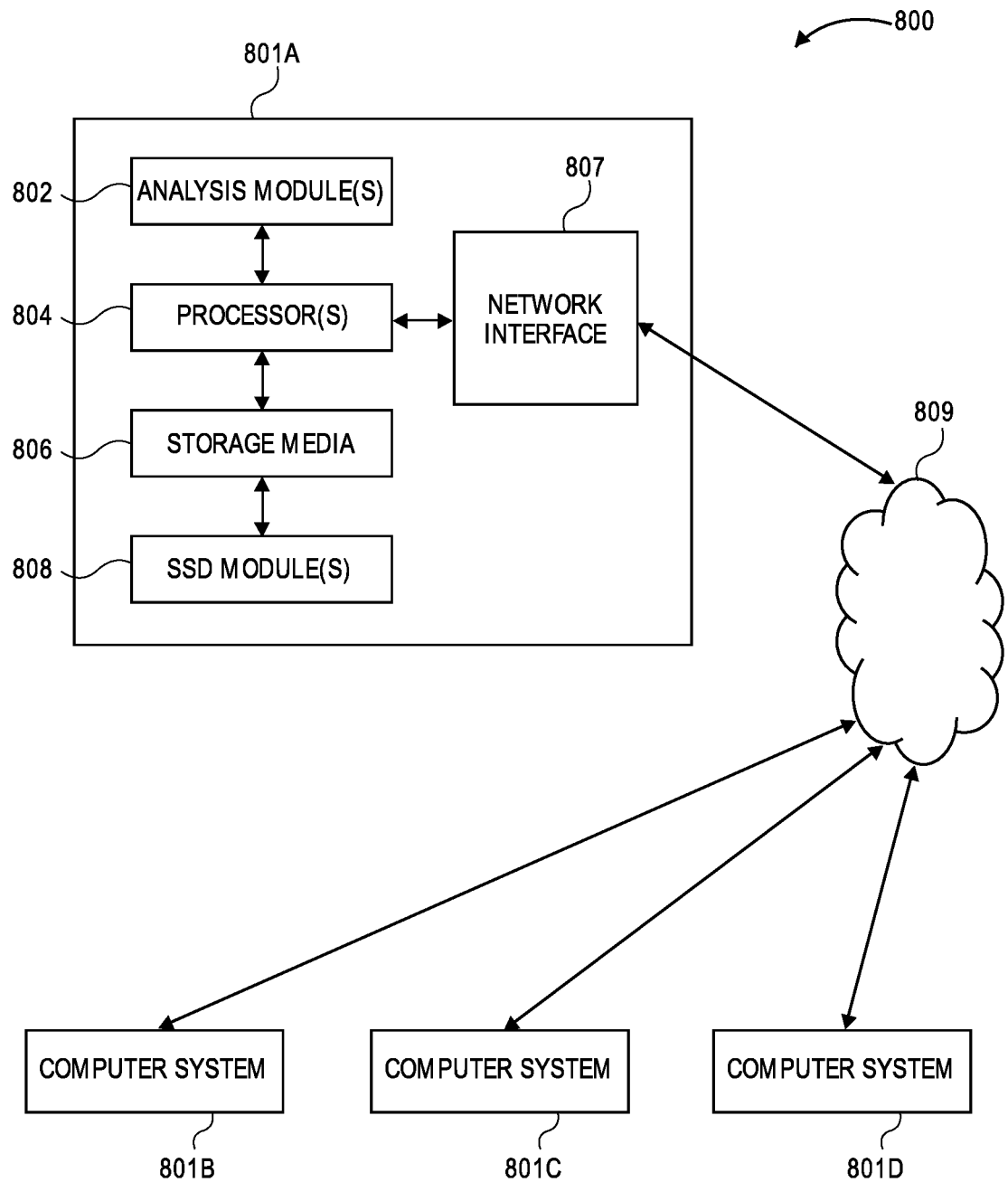
FIG. 8 illustrates a schematic view of a computing system, according to an embodiment.

In some embodiments, any of the methods of the present disclosure may be executed by a computing system. FIG. 8 illustrates an example of such a computing system 800, in accordance with some embodiments. The computing system 800 may include a computer or computer system 801A, which may be an individual computer system 801A or an arrangement of distributed computer systems. The computer system 801A includes one or more analysis module(s) 802 configured to perform various tasks according to some embodiments, such as one or more methods disclosed herein. To perform these various tasks, the analysis module 802 executes independently, or in coordination with, one or more processors 804, which is (or are) connected to one or more storage media 806. The processor(s) 804 is (or are) also connected to a network interface 807 to allow the computer system 801A to communicate over a data network 809 with one or more additional computer systems and/or computing systems, such as 801B, 801C, and/or 801D (note that computer systems 801B, 801C and/or 801D may or may not share the same architecture as computer system 801A, and may be located in different physical locations, e.g., computer systems 801A and 801B may be located in a processing facility, while in communication with one or more computer systems such as 801C and/or 801D that are located in one or more data centers, and/or located in varying countries on different continents).

A processor can include a microprocessor, microcontroller, processor module or subsystem, programmable integrated circuit, programmable gate array, or another control or computing device.

The storage media 806 can be implemented as one or more computer-readable or machine-readable storage media. Note that while in the example embodiment of FIG. 8 storage media 806 is depicted as within computer system 801A, in some embodiments, storage media 806 may be distributed within and/or across multiple internal and/or external enclosures of computing system 801A and/or additional computing systems. Storage media 806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or, in other embodiments, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 800 contains one or more inversion module(s) 808. In the example of computing system 800, computer system 801A includes the inversion module 808. In some embodiments, a single inversion module may be used to perform at least some aspects of one or more embodiments of the methods. In another embodiment, a plurality of inversion modules may be used to perform at least some aspects of methods.

It should be appreciated that computing system 800 is one example of a computing system, and that computing system 800 may have more or fewer components than shown, may combine additional components not depicted in the example embodiment of FIG. 8, and/or computing system 800 may have a different configuration or arrangement of the components depicted in FIG. 8. The various components shown in FIG. 8 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 800, FIG. 8), and/or through manual control by a user who may make determinations regarding whether a given action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for seismic processing, comprising:
   receiving seismic data representing a subsurface volume, wherein the seismic data comprises a first horizontal component and a second horizontal component;
   rotating the first and second horizontal components such that the first horizontal component is substantially aligned with a source of a seismic wavefield and the second horizontal component is substantially transverse to the source of the seismic wavefield;
   determining a splitting intensity at a boundary of the subsurface volume using the first and second horizontal components after the first and second horizontal components are rotated;
   determining an anisotropic parameter for a portion of the subsurface volume as a function of time using the splitting intensity, wherein the anisotropic parameter as the function of time comprises a delay time between shear waves polarized in different symmetry planes; and
   determining an anisotropic parameter for the portion of the subsurface volume as a function of depth using the splitting intensity, wherein the anisotropic parameter as the function of depth comprises a gamma parameter.

2. The method of claim 1, wherein the seismic data comprises multi-azimuth P-S (S-S) multicomponent data.

3. The method of claim 1, wherein the seismic data is received by a sensor positioned at the surface, on a sea bed, or in a wellbore.

4. The method of claim 1, wherein the seismic data further composes a first vertical component.

5. The method of claim 1, further comprising removing coherent noise from the first and second horizontal components after the first and second horizontal components are rotated and before the splitting intensity is determined.

6. The method of claim 1, wherein the splitting intensity is determined as a function of azimuth at different depths.

7. The method of claim 1, further comprising determining a sensitivity kernel that links the splitting intensity to a first depth and a second depth, and wherein determining the anisotropic parameter as the function of depth comprises inverting the splitting intensity at the first depth and the second depth using the sensitivity kernel.

8. The method of claim 1, further comprising performing a drilling action in response to the anisotropic parameter as a function of time, the anisotropic parameter as a function of depth, or a combination thereof.

9. The method of claim 1, wherein the anisotropic parameter as the function of time comprises a delay time between shear waves polarized in different symmetry planes.

10. The method of claim 1, wherein determining the anisotropic parameter for the portion of the subsurface volume as the function of depth using the splitting intensity comprises inverting the splitting intensity measured at different depths.

11. A non-transitory computer-readable medium storing instructions that, when executed by at least one processor of a computing system, cause the computing system to perform operations, the operations comprising:
    receiving seismic data representing a subsurface volume, wherein the seismic data comprises a first horizontal component and a second horizontal component;
    rotating the first and second horizontal components such that the first horizontal component is substantially aligned with a source of a seismic wavefield and the second horizontal component is substantially transverse to the source of the seismic wavefield;
    determining a splitting intensity at a boundary of the subsurface volume using the first and second horizontal components after the first and second horizontal components are rotated;
    determining an anisotropic parameter for a portion of the subsurface volume as a function of time using the splitting intensity, wherein the anisotropic parameter as a function of time comprises a delay time between shear waves polarized in different symmetry planes;
    determining a sensitivity kernel that links the splitting intensity to a first depth and a second depth; and
    determining an anisotropic parameter for the portion of the subsurface volume as a function of depth, wherein determining the anisotropic parameter as the function of depth comprises inverting the splitting intensity at the first depth and the second depth using the sensitivity kernel, and wherein the anisotropic parameter as the function of depth comprises a gamma parameter.

12. The non-transitory computer-readable medium of claim 11, wherein the seismic data comprises multi-azimuth P-S(S-S) multicomponent data.

13. The non-transitory computer-readable medium of claim 11, wherein the seismic data further comprises a first vertical component.

14. The non-transitory computer-readable medium of claim 11, wherein the operations further comprise removing coherent noise from the first and second horizontal components after the first and second horizontal components are rotated and before the splitting intensity is determined.

15. The non-transitory computer-readable medium of claim 11, wherein the splitting intensity is determined as a function of azimuth at different depths.

16. A computing system comprising:
one or more processors; and
a memory system comprising one or more non-transitory computer-readable media storing instructions that, when executed by at least one of the one or more processors, cause the computing system to perform operations, the operations comprising:
receiving seismic data representing a subsurface volume, wherein the seismic data comprises a first horizontal component and a second horizontal component;
rotating the first and second horizontal components such that the first horizontal component is substantially aligned with a source of a seismic wavefield and the second horizontal component is substantially transverse to the source of the seismic wavefield;
determining a splitting intensity at a boundary of the subsurface volume using the first and second horizontal components after the first and second horizontal components are rotated;
determining an anisotropic parameter for a portion of the subsurface volume as a function of time using the splitting intensity, wherein the anisotropic parameter as the function of time comprises a delay time between shear waves polarized in different symmetry planes; and
determining an anisotropic parameter for the portion of the subsurface volume as a function of depth using the splitting intensity, wherein the anisotropic parameter as the function of depth comprises a gamma parameter.

17. The computing system of claim 16, wherein the operations further comprise determining a sensitivity kernel that links the splitting intensity to a first depth and a second depth, and wherein determining the anisotropic parameter as the function of depth comprises inverting the splitting intensity at the first depth and the second depth using the sensitivity kernel.

18. The computing system of claim 17, further comprising transmitting a signal to cause a trajectory of a wellbore to be varied in response to the anisotropic parameter as a function of time, the anisotropic parameter as a function of depth, or a combination thereof.

* * * * *